United States Patent Office 3,751,452
Patented Aug. 7, 1973

3,751,452
PROCESS FOR PRODUCING ADAMANTYL ESTERS OF POLYHYDRIC ALCOHOLS
Yoshiaki Inamoto and Hirokazu Nakayama, Wakayama, Hidetsugu Takenaka, Arita, and Yoshitomo Kimura, Wakayama, Japan, assignors to Kao Soap Co., Ltd., Tokyo, Japan
No Drawing. Filed July 20, 1971, Ser. No. 164,412
Claims priority, application Japan, July 24, 1970, 45/64,886
Int. Cl. C07c 61/12
U.S. Cl. 260—468 G          6 Claims

ABSTRACT OF THE DISCLOSURE

A compound of the formula $$R_mC(CH_2OCO(CH_2)_n\text{-}Ad)_{4-m}$$

wherein $m$ is 0, 1 or 2; $n$ is 0 or 1; "Ad" is adamantyl or alkyl-substituted adamantyl; and R is hydrogen, alkyl, cycloalkyl or aralkyl. The compound is prepared by esterifying a polyhydric alcohol of the formula $$R_mC(CH_2OH)_{4-m}$$

with a carboxylic acid of the formula $$Ad\text{-}(CH_2)_n\text{—COOH}$$

The compounds are useful as lubricants, plasticizers, viscosity improvers, etc.

---

This invention relates to a process for producing novel esters by a reaction between carboxylic acids having adamantyl groups and polyhydric alcohols. More particularly, the present invention relates to a process for producing adamantyl esters of polyhydric alcohols having the following Formula I:

$$R_mC(CH_2OCO(CH_2)_n\text{-}Ad)_{4-m} \qquad (I)$$

wherein $m$ is 0, 1, or 2; $n$ is 0 or 1; "Ad" represents adamantyl or alkyl (C1–C4)-substituted adamantyl groups; and R is selected from the group consisting of hydrogen, alkyl having 1 to 22 carbon atoms, cycloalkyl having 3 to 22 carbon atoms and aralkyl of the structure

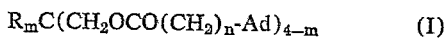

where $p$ is 1 or 2 and alkyl has 1 to 22 carbon atoms. R can be either the same or different when $m$ is 2.

The process comprises esterifying, in the presence of suitable catalyst, a polyhydric alcohol having the following Formula II:

$$R_mC(CH_2OH)_{4-m} \qquad (II)$$

wherein $m$ and R have the same meanings as defined above, with a carboxylic acid having the following Formula III:

$$Ad\text{—}(CH_2)_n\text{—COOH} \qquad (III)$$

wherein Ad and $n$ have the same meanings as defined above.

The novel compounds prepared according to the present invention have adamantyl groups therein so that they have a good heat stability and other characteristic advantageous properties. The novel compounds can be utilized for many purposes, for example, as a lubricant, a plasticizer, a viscosity improver, a component of an oiling agent for synthetic fibers, a plastic additive and a synthetic lubricating oil.

The process of the esterification reaction in the present invention does not differ substantially from that in the known esterification of fatty acids and aliphatic alcohols.

Catalysts which may be effectively used for the esterification reaction according to the present invention are acid catalysts such as sulfuric acid, aliphatic and aromatic sulfonic acids, and boron trifluoride, neutral or alkaline catalysts such as oxides or hydroxides of a member selected from the group consisting of alkali metals, alkaline earth metals, zinc, cadmium, tin, lead, antimony and bismuth, which are all well known as effective catalysts for esterification.

Examples of the polyhydric alcohols having the Formula II are pentaerythritol, trimethylolpropane (1,1,1-tris(hydroxymethyl)propane), neopentylglycol, trimethyleneglycol, etc. Examples of the carboxylic acids of the Formula III are adamantane-1-carboxylic acid, 3-methyladamantane-1-carboxylic acid, 3,5 - dimethyl-adamantane-1-carboxylic acid, adamantyl-1-acetic acid, 3-methyladamantyl-1-acetic acid, etc.

It is preferable to use an excess of the said carboxylic acid (III) in the present esterification reaction in order to reduce the reaction time, although it is not essential for the completion of the esterification in the present invention to use an excess of the carboxylic acid. The amount of the catalyst used for the esterification is from 0.0001 to 0.2 equivalent per mole of the carboxylic acid used, preferably from 0.001 to 0.02 equivalent. The esterification of the present invention can be completed within 24 hours by the use of the above-mentioned catalyst in the amounts as specified above. The reaction temperature does not differ substantially from that used for the esterification of aliphatic acids: that is, a temperature between 30° to 300° C., preferably a temperature between 50° and 250° C.

The water produced during the esterification is removed out of the reaction system by any of the known procedures such as distillation under reduced pressure, withdrawal by passing inert gas through the reaction mixture, azeotropic distillation, etc.

Sublimation of adamantane-containing carboxylic acids sometimes causes trouble if excess acid is used. In these cases, it is preferable to use solvents, which also function as azeotropic dehydrating agents, such as cyclohexane, benzene, toluene, xylene, etc. Sublimation of the said carboxylic acids can be prevented effectively by the use of these solvents.

The present invention will be further illustrated by the following examples, wherein all melting points are uncorrected, and the term "parts" refers to parts by weight unless otherwise noted.

EXAMPLE 1

Preparation of tetrakis(adamantly-1-carbonyloxymethyl)methane(I; $m=0$, $n=0$)

In a reaction flask provided with the water separator described in Organic Syntheses, Coll. vol. 3, page 382, a mixture of 3.4 parts of pentaerythritol, 18.0 parts of adamantane-1-carboxylic acid, 5.0 parts by volume of mixed xylene and 0.05 part of stannous oxide was refluxed with stirring, at a tempertaure below 230° C. for 12 hours.

After cooling the reaction mixture to about 50° C., 200 parts by volume of xylene and 50 parts by volume of warm water were added, and the resulting mixture was stirred at the same temperature for 30 minutes. The xylene layer was separated, and washed repeatedly each time with 30 parts by volume of cold, saturated solution of sodium bicarbonate until the aqueous washings became distinctly alkaline, and finally with water until neutral.

The xylene solution was dried over anhydrous sodium sulfate, and xylene was evaporated to give 18.8 parts (yield 96%) of crude tetrakis(adamantyl-1-carbonyloxymethyl)methane, colorless solid with M.P. 275°–279° C., saponification value 283.1 (calculated 286.0), and acid value 0.23 (calculated 0).

The crude product was recrystallized from methyl ethyl ketone to give the pure sample, colorless platelets with M.P. 279°–281° C.

*Analysis.*—Calc. for $C_{49}H_{68}O_8$ (percent): C, 74.96; H, 8.73; O, 16.31. Found (percent): C, 75.9; H, 8.8; O, 15.7.
IR spectrum (KBr, cm.$^{-1}$):

1730 (s.):($\nu c=0$), ester
1230 (s.), 1080 (s.):($\nu co$-$o$-$c$), ester

NMR spectrum (CDCl$_3$ solution, TMS as internal standard, $\tau$ (tau).

5.88 (s., 8H): C$(CH_2O)_4$
7.7–8.4 (complex m, 60 H; with signals at 8.11 (s.) and 8.28 (s.):)H's on adamantane rings.

EXAMPLE 2

Production of tetrakis(adamantyl-1-acetoxymethyl) methane (I; $m=0$, $n=1$)

In the same apparatus as used in Example 1, a mixture of 3.4 parts of pentaerythritol, 24.0 parts of adamantyl-1-acetic acid, 0.003 part of zinc oxide and 5.0 parts by volume of xylene was refluxed with stirring, at a temperature below 225° C. for 17 hours while removing the water produced. The reaction mixture was treated in the same way as in Example 1 to give 20.8 parts (yield 98%) of crude (I) $m=0$, $n=1$), colorless solid with M.P. 161°–166° C., saponification value 263.9 (calculated 266.8), acid value 0.85 (calculated 0).

The crude product was recrystallized first from cyclohexane and then from methyl ethyl ketone to give pure sample, colorless platelets with M.P. 165°–167° C.

*Analysis.*—Calcd. for $C_{57}H_{76}O_8$ (percent): C, 75.67; H, 9.11; O, 15.22. Found (percent): C, 75.7; H, 9.0; 15.4.
IR spectrum (KBr, cm.$^{-1}$):

1735 (s.):($\nu c=0$), ester
1260 (m.), 1130 (s.):($\nu co$-$o$-$c$), ester

NMR spectrum, CDCl$_3$ solution, TMS as internal standard, $\tau$):

5.90 (s. 8H):C$(CH_2O)_4$
7.93 (s., 8H):Ad—CH$_2$COO—
8.07 (undissolved resonance, 12H): Adamantane tertiary H's.
8.39 (undissolved resonance, 48H): Admantane secondary H's.

EXAMPLE 3

Production of 1,1,1-tris(Adamantyl-1-carbonyloxymethyl) propane (I; R=C$_2$H$_5$, $m=1$, $n=0$)

In the same apparatus as used in Example 1, a mixture of 5.37 parts of 1,1,1-tris(hydroxymethyl)propane (trimethylolpropane), 21.63 parts of adamantane-1-carboxylic acid, 0.03 part of zinc oxide and 6.0 parts by voume of xylene was refluxed with stirring, at a temperature below 210° C. for 24 hours while removing the water produced.

The reaction mixture was treated in the same manner as in Example 1 to give 22.8 parts (yield 92%) of crude (I) (R=C$_2$H$_5$, $m=1$, $n=0$), colorless solid with M.P. 183°–189° C., saponification value 268.3 (calculated 271.1), acid value 0.61 (calculated 0).

The crude product was recrystallized from benzene to give the pure sample, colorless platelets with M.P. 189°–191° C.

*Analysis.*—Calcd. for $C_{39}H_{56}O_6$ (percent): C, 75.44; H, 9.09; O, 15.46. Found (percent): C, 75.9; H, 9.1; O, 15.2.
IR spectrum (KBr), cm.$^{-1}$):

1730 (s.):($\nu c=0$), ester
1220 (s.), 1080 (s.):($\nu co$-$o$-$c$), ester

NMR spectrum (CDCl$_3$ solution, TMS as internal standard, $\tau$):

5.96 (s., 6H):EtC$(CH_2O)_3$
7.7–8.3 (complex m, 45H):H's on adamantane rings
8.46 (q., J=7 Hz., 2H):CH$_3$CH$_2$C
9.10 (t., J=7 Hz., 3H):CH$_3$CH$_2$C

EXAMPLE 4

Production of 2,2-bis(adamantyl-1-carbonyloxymethyl) propane (I; R=CH$_3$, $m=2$, $n=0$).

In the same apparatus as used in Example 1, a mixture of 5.21 parts of 2,2-bis(hydroxymethyl) propane(neopentylglycol), 21.63 parts of adamantane-1-carboxylic acid, 0.02 part of stannous oxide and 4.0 parts by volume of xylene was refluxed with stirring, at a temperature below 210° C. for 24 hours while removing the water produced.

The reaction mixture was treated in the same manner as in Example 1 to give 20.3 parts (yield 95%) of crude (I) (R=CH$_3$, $m=2$, $n=0$), white solid with M.P. 150°–154° C., saponification value 261.4 (calculated 262.0), acid value 0.25 (calculated 0).

The crude product was recrystallized twice from benzene to give the pure sample, white platelets with M.P. 155°–157° C.

*Analysis.*—Calcd. for $C_{27}H_{40}O_4$ (percent): C, 75.66; H, 9.41; O, 14.93. Found (percent): C, 75.4; H, 9.4; O, 14.8.
IR spectrum (KBr, cm.$^{-1}$):

1730 (s.):($\nu c=0$), ester)
1250 (s.), 1090 (s.):($\nu co$-$o$-$c$), ester

NMR spectrum (CDCl$_3$ solution, TMS as internal standard, $\tau$):

6.11 (s., 4H):>C$(CH_2O)$
7.8–8.5 (m., with signals at 8.08 (s.) and 8.27, (s.), 3OH): H's on adamantane rings.
9.01 (s., 6H):(CH$_3$)$_2$C<

Mass spectrum (m/e (relative intensity))
428 (0.5) (parent peak), 399 (0.2), 293 (12.4), 249 (8.8), 235 (0.3), 207 (3.3), 179 (3.8), 163 (11.6), 136 (12.7), 135 (100.0)

EXAMPLE 5

Production of 1,3-bis(adamantyl-1-carbonyloxy)-propane (I; R=H, $m=2$, $n=0$).

In the same apparatus as used in Example 1, a mixture of 3.80 parts of 1,3-propanediol, 23.43 parts of adamantane-1-carboxylic acid, 0.51 parts of p-toluenesulfonic acid crystals and 15 parts by volume of toluene was refluxed with stirring at a temperature between 145° and 155° C. for 22 hours while removing the water produced.

To the cooled reaction mixture 200 parts by volume of toluene were added, and the resulting mixture was washed twice each time with 100 parts by volume of water, then with saturated sodium bicarbonate solution until the washings became distinctly alkaline, and finally with water until the washings became neutral. The resulting toluene solution was dried over anhydrous sodium sulfate, and was fractionally distilled under reduced pressure.

Collection of the fraction boiling from 215° to 217° C. (0.1 mm. Hg) gave 17.9 parts (yield 89%) of pure (I) (R=H, $m=2$, $n=0$), colorless liquid which solidified (M.P. 20–22° C.) on standing.

*Analysis.*—Calcd. for $C_{25}H_{36}O_4$ (percent): C, 74.96; H, 9.06; O, 15.98. Found: C, 74.8; H, 8.9; O, 16.1.

IR spectrum (liquid film, cm.$^{-1}$):

1730 (s.):($\nu c=0$), ester
1230 (s.) 1075 (s.):($\nu co$-$co$-$c$), ester

NMR spectrum (CCl$_4$ solution, TMS as internal standard, $\tau$):

5.92, t., J=7 Hz., 4H):CH$_2$$(CH_2$—O$)_2$
7.85–8.45 (m, with signals at 8.01, 8.12 and 8.28, 3OH): H's on adamantane rings.
8.45–8.9 (complex m, 2H):CH$_2$$(CH_2$—O$)_2$ Mass spectrum (m/e (relative intensity))
400 (0.3) (parent peak), 265 (5.6), 237 (1.8), 221 (12.6), 207 (0.6), 163 (3.8), 135 (100.0).

The embodiments of the invention in which an exclusive property or privilege is claimed are defined as follows:

1. A compound of the formula $$R_mC(CH_2OCO(CH_2)_n-Ad)_{4-m}$$

wherein $m$ is 0, 1 or 2;

$n$ is 0 or 1;

Ad is adamantyl or alkyl-substituted adamantyl in which the alkyl has from 1 to 4 carbon atoms;

R is hydrogen, alkyl having from 1 to 22 carbon atoms, cycloalkyl having from 3 to 22 carbon atoms or aralkyl of the formula

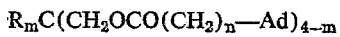

in which $p$ is 1 or 2, and alkyl has from 1 to 22 carbon atoms, and R being the same or different when $m=2$.

2. A compound as claimed in claim 2, consisting of tetrakis (adamantyl-1-carbonyloxymethyl)methane.

3. A compound as claimed in claim 2, consisting of tetrakis (adamantyl-1-acetoxymethyl)methane.

4. A compound as claimed in claim 2, consisting of 1,1,1-tris(adamantyl-1-carbonyloxymethyl)propane.

5. A compound as claimed in claim 2, consisting of 2,2-bis(adamantyl-1-carbonyloxymethyl)propane.

6. A compound as claimed in claim 2, consisting of 1,3-bis(adamantyl-1-carbonyloxy)propane.

References Cited

UNITED STATES PATENTS

| | | | |
|---|---|---|---|
| 3,407,191 | 10/1968 | Gerzon et al. | 260—211.5 |
| 3,565,942 | 2/1971 | Krimmel | 260—468 |

FOREIGN PATENTS

| | | | |
|---|---|---|---|
| 1,194,911 | 6/1970 | Great Britain | 260—333 |

LORRAINE A. WEINBERGER, Primary Examiner

R. GERSTL, Assistant Examiner

U.S. Cl. X.R.

252—57; 260—31.6